US009026592B1

(12) United States Patent
Marra (10) Patent No.: US 9,026,592 B1
(45) Date of Patent: May 5, 2015

(54) PROMOTING USER INTERACTION BASED ON USER ACTIVITY IN SOCIAL NETWORKING SERVICES

(75) Inventor: Gregory M. Marra, San Francisco, CA (US)

(73) Assignee: Google Inc., Mountain View, CA (US)

( * ) Notice: Subject to any disclaimer, the term of this patent is extended or adjusted under 35 U.S.C. 154(b) by 248 days.

(21) Appl. No.: 13/269,098

(22) Filed: Oct. 7, 2011

(51) Int. Cl.
*G06F 15/16* (2006.01)
*H04L 29/06* (2006.01)

(52) U.S. Cl.
CPC ................................ *H04L 29/06414* (2013.01)

(58) Field of Classification Search
USPC .................................. 709/203–207, 217–225
See application file for complete search history.

(56) References Cited

U.S. PATENT DOCUMENTS

| | | | |
|---|---|---|---|
| 5,813,863 A | 9/1998 | Sloane et al. | |
| 5,978,928 A | 11/1999 | Rust | |
| 6,643,187 B2 | 11/2003 | Mokhlesi | |
| 2006/0294085 A1 | 12/2006 | Rose et al. | |
| 2008/0059576 A1* | 3/2008 | Liu et al. | 709/204 |
| 2009/0132520 A1 | 5/2009 | Nemeth et al. | |
| 2009/0177588 A1 | 7/2009 | Marchese | |
| 2009/0234945 A1* | 9/2009 | Chande et al. | 709/224 |
| 2009/0271391 A1 | 10/2009 | Kawale et al. | |
| 2010/0036784 A1 | 2/2010 | Mishne et al. | |
| 2010/0241580 A1* | 9/2010 | Schleier-Smith | 705/319 |
| 2010/0262658 A1* | 10/2010 | Mesnage | 709/204 |
| 2011/0022602 A1 | 1/2011 | Luo et al. | |
| 2011/0040760 A1 | 2/2011 | Fleischman et al. | |
| 2011/0041080 A1 | 2/2011 | Fleischman et al. | |
| 2011/0225170 A1 | 9/2011 | Obasanjo et al. | |
| 2011/0246907 A1* | 10/2011 | Wang et al. | 715/751 |
| 2011/0302123 A1 | 12/2011 | Nista et al. | |
| 2011/0302152 A1 | 12/2011 | Boyd et al. | |
| 2011/0314098 A1* | 12/2011 | Farrell et al. | 709/204 |
| 2012/0005203 A1 | 1/2012 | Brzozowski et al. | |
| 2012/0226701 A1* | 9/2012 | Singh | 707/748 |

(Continued)

FOREIGN PATENT DOCUMENTS

| | | |
|---|---|---|
| EP | 2568427 | 3/2013 |
| WO | WO2011064742 A1 | 6/2011 |

OTHER PUBLICATIONS

Jon Duck-Schlossberg et al., "Battlefield Awareness and Data Dissemination Intelligent Information Dissemination Server," Final Technical Report, Air Forces Search Laboratory, Lockheed-Martin Corporation, Nov. 1999, 31 pages.

(Continued)

*Primary Examiner* — Yasin Barqadle
(74) *Attorney, Agent, or Firm* — Fish & Richardson P.C.

(57) ABSTRACT

Methods, systems, and apparatus, including computer programs encoded on a computer storage medium, including actions of, for each user of a plurality of users of a social networking service, determining a user activity score, the user activity score being based on activity of each user within the social networking service, determining that a first user activity score of a first user is greater than or equal to a first threshold user activity score and that a second user activity score of a second user is less than a second threshold user activity score, and, in response to the first user activity score being greater than or equal to the first threshold user activity score and the second user activity score being less than the second threshold user activity score, transmitting instructions to display a prompt to the first user to encourage the first user to interact with the second user.

20 Claims, 6 Drawing Sheets

(56) References Cited

U.S. PATENT DOCUMENTS

2012/0330932 A1   12/2012   Boyd et al.
2013/0018896 A1   1/2013    Fleischman et al.
2013/0024757 A1   1/2013    Doll et al.

OTHER PUBLICATIONS

Lada A. Adamic et al., "Social network caught in the Web," First Monday, vol. 8, No. 6, Jun. 2, 2003, 22 pages.

Alice Emily Marwick, "Selling Your Self: Online Identity in the Age of a Commodified Internet," Thesis for degree of Master of Arts, University of Washington, 2005, 192 pages.

Thomas Erickson et al., "Social Translucence: Using Minimalist Visualizations of Social Activity to Support Collective Interaction," Designing Information Spaces: The Social Navigation Approach (eds. K. Höök, D. Benyon, A Munroe), Springer-Verlag: London, 2003, pp. 17-41.

Ronald van Eijk et al., "We-centric, context-aware, adaptive mobile service bundles," Telematica Instituut, Freeband Frux D1.1, Nov. 30, 2004, 48 pages.

Marc Steen et al., "Development of we-centric, context-aware, adaptive mobile services requires empathy and dialogue," Freeband Frux, 2005, 4 pages.

Tony Hammond et al., "Social Bookmarking Tools (I)," D-Lib Magazine, vol. 11, No. 4, Apr. 2005, 23 pages.

* cited by examiner

PROMOTING USER INTERACTION BASED ON USER ACTIVITY IN SOCIAL NETWORKING SERVICES

TECHNICAL FIELD

This specification generally relates to computer software systems and methods, in particular, systems and methods for promoting user interaction in a social networking service.

BACKGROUND

Internet-based social networking services provide a digital medium for users to interact with one another and share information. For examples, users are able to distribute digital content (e.g., textual comments, digital images, digital videos, digital audio, hyperlinks to websites, etc.) to other users that they might be connected with in the social networking service. Digital content that is distributed to a user can be displayed to the user in a stream page.

In some cases, a user of a social networking service may have established few contacts within the social networking service, or otherwise rarely interact with other users of the social networking service. As a consequence, such users can become discouraged and leave the social networking service.

SUMMARY

In general, innovative aspects of the subject matter described in this disclosure may be embodied in methods that include the actions of, for each user of a plurality of users of a computer-implemented social networking service, determining a user activity score, wherein the user activity score for each user is determined at least in part based on the activity of each user within the computer-implemented social networking service, determining that a first user activity score associated with a first user in the plurality of users is greater than or equal to a first threshold user activity score and that a second user activity score associated with a second user in the plurality of users is less than a second threshold user activity score, and, in response to determining that the first user activity score is greater than or equal to the first threshold user activity score and that the second user activity score is less than the second threshold user activity score, transmitting instructions to display a prompt to the first user to encourage the first user to interact with the second user within the social networking service.

Other implementations of this aspect include corresponding systems, apparatus, and computer programs, configured to perform the actions of the methods, encoded on computer storage devices.

These and other implementations may each optionally include one or more of the following features. For instance, determining the user activity score includes: receiving a plurality of values, each value being associated with a signal that reflects user interaction with the social networking service, and determining the user activity score based on one or more values of the plurality of values; each value is based on one of: a length of time that a respective user has been a member of the social networking service, a time since a respective user has received a notification from the social networking service, a frequency at which a respective user interacts with the social networking service, a frequency at which a respective user interacts with items distributed by other users of the social networking service, a frequency at which a respective user distributes items using the social networking service, a number of contacts of a respective user within the social networking service, a degree of completion of a profile of a respective user, a number of contact suggestions that have been accepted by a respective user, a number of features of the social networking service that have been used by a respective user, and an average duration that a respective user interacts with the social networking service; determining the user activity score includes summing the values; determining the user activity score includes applying a respective weight to each value of the plurality of values; the user activity score ranges between a minimum value and a maximum value; the prompt includes displaying a graphical representation of a profile of the second user within a contact display of the first user; the graphical representation comprises a contact icon; the prompt includes a notification requesting the first user to assist the second user with a task within the social networking service; the task includes completing a profile associated with the second user; the task includes using a feature of the social networking service; actions further include: identifying an item distributed by the second user to the first user using the social networking service, the item being associated with an item score, and determining that the item score is less than a threshold item score, the threshold item score defining a minimum item score for items to be displayed in a stream page of the first user, wherein, in response to determining that the second user activity score is less than the second threshold user activity score, the instructions comprise instructions to display the item in the stream page, the prompt comprising the item; actions further comprise transmitting instructions to display an item within a stream page of the first user, the item having been distributed by the second user, wherein the prompt comprises a notification associated with the item in the stream page; and actions further include determining that the first user is at least potential contact of the second user within the social networking service, wherein transmitting instructions is further in response to determining that the first user is a potential contact of the second user within the social networking service.

Implementations of the present disclosure provide one or more of the following example advantages. Users that less frequently interact with a social networking service are encouraged and supported before abandoning the social networking service. Users are taught best practices and learn how to use features of the social networking service by other users. Users that more frequently use the social networking service are able to help other users, creating a sense of goodwill.

The details of one or more implementations of the subject matter described in this specification are set forth in the accompanying drawings and the description below. Other potential features, aspects, and advantages of the subject matter will become apparent from the description, the drawings, and the claims.

DETAILED DESCRIPTION

1. Overview

In general, implementations of the present disclosure are directed to promoting user interactions in a social networking service. In particular, implementations of the present disclosure are directed to promoting user interactions based on user activity scores. In some examples, one or more users of the social networking service can be suggested as contacts to one or more other users based on respective user activity scores. In some examples, ranking and ordering of items displayed to a user within a stream page of the user can be influenced based on user activity scores. In some examples, users can be prompted to assist one or more other users in interacting with the social networking service based on user activity scores.

In some implementations, users can opt into or opt out of interaction encouragement based on user activity scores. In some examples, a user can opt out of or opt into receiving contact suggestions based on user activity scores associated with potential contacts within the social networking service. In some examples, a user can opt out of or opt into assisting other users (e.g., less frequent users) in their use of the social networking service.

In some implementations, each user of the social networking service can be associated with a user activity score. The user activity score reflects a degree of interaction of the user with the social networking service. In some examples, the user activity score can range between a minimum value (e.g., 0) and a maximum value (e.g., 1). In some examples, a user can be categorized based on their respective activity score. In some examples, if the user activity score is greater than or equal to a first threshold user activity score, the user can be categorized as a prolific user. As used herein, the phrase "prolific user" encompasses its plain and ordinary meaning, including but not limited to users that very frequently interact with the social networking service (e.g., generate and distribute a significant amount of content within the social networking service). In some examples, if the user activity score is less than the first threshold user activity score and is greater than or equal to a second threshold user activity score, the user can be categorized as a frequent user. As used herein, the phrase "frequent user" encompasses its plain and ordinary meaning, including but not limited to users that frequently interact with the social networking service (e.g., often generate and distribute content within the social networking service). In some examples, if the user activity score is less than the second threshold user activity score, the user can be categorized as an infrequently is appreciated that other thresholds and/or categories can be implemented. user. As used herein, the phrase "infrequent user" encompasses its plain and ordinary meaning, including but not limited to users that rarely interact with the social networking service (e.g., generate and distribute little content within the social networking service).

In some examples, user categories can include very prolific users, prolific users, frequent users, regular users, infrequent users, and rare users. In some examples, promoting interactions between users can be based on extremes (e.g., encouraging very prolific users to interact with rare users). In some examples, promoting interactions between users can be based on compatible categories. In one example, regular users can be encouraged to interact with rare users. In this manner, very prolific users are not overwhelmed with being encouraged to interact with rare users.

In some implementations, the user activity score can be determined based on one or more signals that reflect the user's interaction with the social networking service. Example signals can include how long the user has been using the social networking service, how recently the user has received a notification from the social networking service, how often the user interacts with the social networking service, how often the user interacts with items distributed by other users of the social networking service, how often the user distributes items using the social networking service, how many contacts the user has within the social networking service, a degree of completion of a profile of the user, a number of contact suggestions that have been accepted by the user, how many features of the social networking service used by the user, and a duration that the user interacts with the social networking service. As discussed in further detail below, each of the signals can be quantified and one or more of the signals can be combined to determine the user activity score.

In some implementations, one or more users of the social networking service can be suggested as contacts to one or more other users based on respective user activity scores. In some examples, an infrequent user can be promoted to a prolific user as a potential contact within the social networking service. In this manner, an infrequent user of the social networking service can be paired with a prolific user to promote interaction with the infrequent user within the social networking service.

In some implementations, ranking and ordering of items displayed to a user within a stream page of the user can be influenced based on user activity scores. As discussed in further detail herein, the stream page displays items (digital content) that has been posted by the user to the social networking service and/or items (digital content) distributed to the user through the social networking service. In some examples, each item that is to be displayed in the stream page of a user is associated with an item score and one or more user activity scores. Items are displayed within the stream page of the user based on the item scores and/or the user activity scores. In some examples, items displayed within the stream page of the user can include a compilation of items having relatively high items scores (i.e., as compared to other items) and items associated with one or more infrequent users, regardless of their associated item scores.

In some examples, items that are to be displayed to a user are organized into groups. Within each group, the items are can be put in an order based on item score and/or user activity score. In some examples, the item score reflects a quality of the item and a relevance of the item to the particular user. In some implementations, the item score is determined based on a quality score, a social score and a relevance score. In some implementations, the quality score is determined based on an author status score and a content score. The quality score reflects an overall quality of the associated item. The status score is an author-specific score and is determined based on characteristics of the author of the item within the social networking service. The content score is an item-specific score and is determined based on interactions of other users with the particular item (e.g., commenting on the item, sharing the item, endorsing the item). The social score is a user-specific, item-specific score and is determined based on a social affinity between the user that may be receiving the item in a stream page and the author user of the item. A social affinity between a particular user of the social networking service and other users of the social networking service can be determined based on a social graph of the particular user. The relevance score is a user-specific, item-specific score and is determined based on a relevance of the particular item to the user that may be receiving the item.

In some implementations, the item score can be further based on the user activity score of the user that generated and distributed the item. In this manner, the item score can account for the user activity score.

In some examples, a quota can be provided for items to be displayed within the stream page. For example, a quota can include an X/Y split indicating that X % of the items to be displayed are selected based on item score and Y % of the items to be displayed are selected based on user activity score. In this manner, items distributed by infrequent users can be surfaced in the stream pages of other users to promote interaction of the other users with the infrequent users (i.e., users are more likely to interact with items displayed more prominently in their stream page).

In some implementations, users can be prompted to assist one or more other users in interacting with the social networking service based on user activity scores. In some examples, an infrequent user can be identified to a prolific user in an effort to induce the prolific user to interact with the infrequent user. In some examples, the infrequent user and the prolific user are already contacts within the social networking service when the infrequent user is identified to the prolific user. For example, a first user and a second user can be contacts within the social networking service. The first user can be associated with a first user activity score and can be categorized as an infrequent user based on the first user activity score. The second user can be associated with a second user activity score and can be categorized as a prolific user based on the second user activity score. The second user can receive a notification from the social networking service in an effort to promote interaction with the first user. An example notification can include a request to assist the first user in completing a profile associated with the first user within the social networking service.

2. System

For purposes of illustration, an example social networking service will be described. The example social networking service enables users to organize contacts into social circles. It is appreciated, however, that implementations of the present disclosure can be used in other types of social networking services and are not limited to example social networking services discussed herein.

In general, social circles are categories to which a user can assign contacts and better control the distribution and visibility of social networking posts and/or other digital content distributed using the social networking service. In some implementations, a social circle can be provided as a data set defining a collection of contacts that are associated with one another in a computer-implemented social networking service. Generally, a social circle can be described from the perspective of an individual that is the center of a particular collection of socially interconnected people, or from the aggregate perspective of a collection of socially interconnected people. A social circle can have narrowly defined boundaries (e.g., members of the social circle might be familiar with one another) and permission may be required for a member to join a social circle. A user of the social networking service can define a social circle. The social circle, as a data set defining a collection of contacts, may reflect real-life social connections and/or interactions of the user. In some implementations, a social circle can be defined by a user as a personal representation or grouping of a set of contacts, the contacts may be unaware of the social circle and/or unaware of other members of the social circle.

Through the creation and use of social circles, the user can organize and categorize social networking contacts into various different groupings that can be used to control the visibility and access those contacts have to the user's postings, digital pictures, videos, audio files, hyperlinks (e.g., uniform resource indicators, URIs), and/or other content associated with the user's social networking profile. As one example, the user can post an update about a work-related nuance to only a "coworker" circle, and spare other contacts within the social networking service from seeing information that is irrelevant to them.

Figure 1:
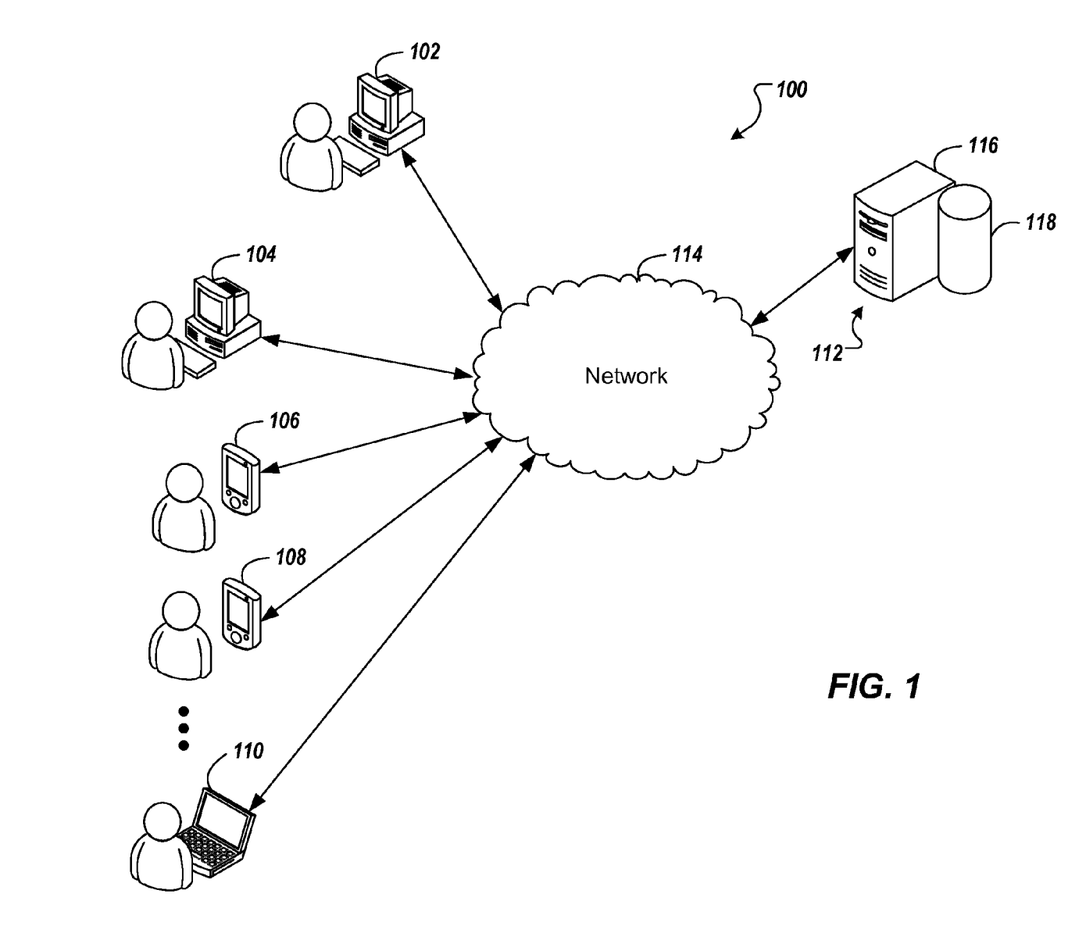
FIG. 1 is a diagram of an example network architecture.

FIG. 1 is a diagram of an example network architecture 100. The network architecture 100 includes a number of client devices 102-110 communicably connected to a server system 112 by a network 114. The server system 112 includes a processing device 116 and a data store 118. The processing device 116 executes computer instructions (e.g., social network computer program code, and/or IM computer program code) stored in the data store 118 to perform the functions of a social network server and/or IM server.

Users of the client devices 102-110 access the server device 112 to participate in a social networking service. For example, the client devices 102-110 can execute web browser applications that can be used to access the social networking service and/or an IM service. In another example, the client devices 102-110 can execute software applications that are specific to the social networking service and/or the IM service (e.g., social networking and/or IM "apps" running on smartphones).

Users interacting with the client devices 102-110 can participate in the social networking service provided by the server system 112 by digital content, such as text comments (e.g., updates, announcements, replies), digital images, videos, audio files, and/or other appropriate digital content. In some implementations, information can be posted on a user's behalf by systems and/or services external to the social networking service or the server system 112. For example, the user may post a review of a movie to a movie review website, and with proper permissions that website may cross-post the review to the social networking service on the user's behalf. In another example, a software application executing on a mobile device, with proper permissions, may use global positioning system (GPS) capabilities to determine the user's location and automatically update the social network with his location (e.g., "At Home", "At Work", "In Brownsdale, Minn."). Generally, users interacting with the client device 102-110 can also use the social networking service provided by the server system 112 to define social circles to organize and categorize the user's relationships to other users of the social networking service. Examples of the creation and use of social circles are provided in the description of FIG. 2.

In some implementations, the client devices 102-110 can be provided as computing devices such as laptop or desktop computers, smartphones, personal digital assistants, portable media players, tablet computers, televisions with embedded and/or connected processor(s), or other appropriate computing devices that can be used to communicate with an electronic social network. In some implementations, the server system 112 can be a single computing device such as a computer server. In some implementations, the server system 112 can represent more than one computing device working together to perform the actions of a server computer (e.g., cloud computing). In some implementations, the network 114 can be a public communication network (e.g., the Internet, cellular data network, dialup modems over a telephone network) or a private communications network (e.g., private LAN, leased lines).

Figure 2:
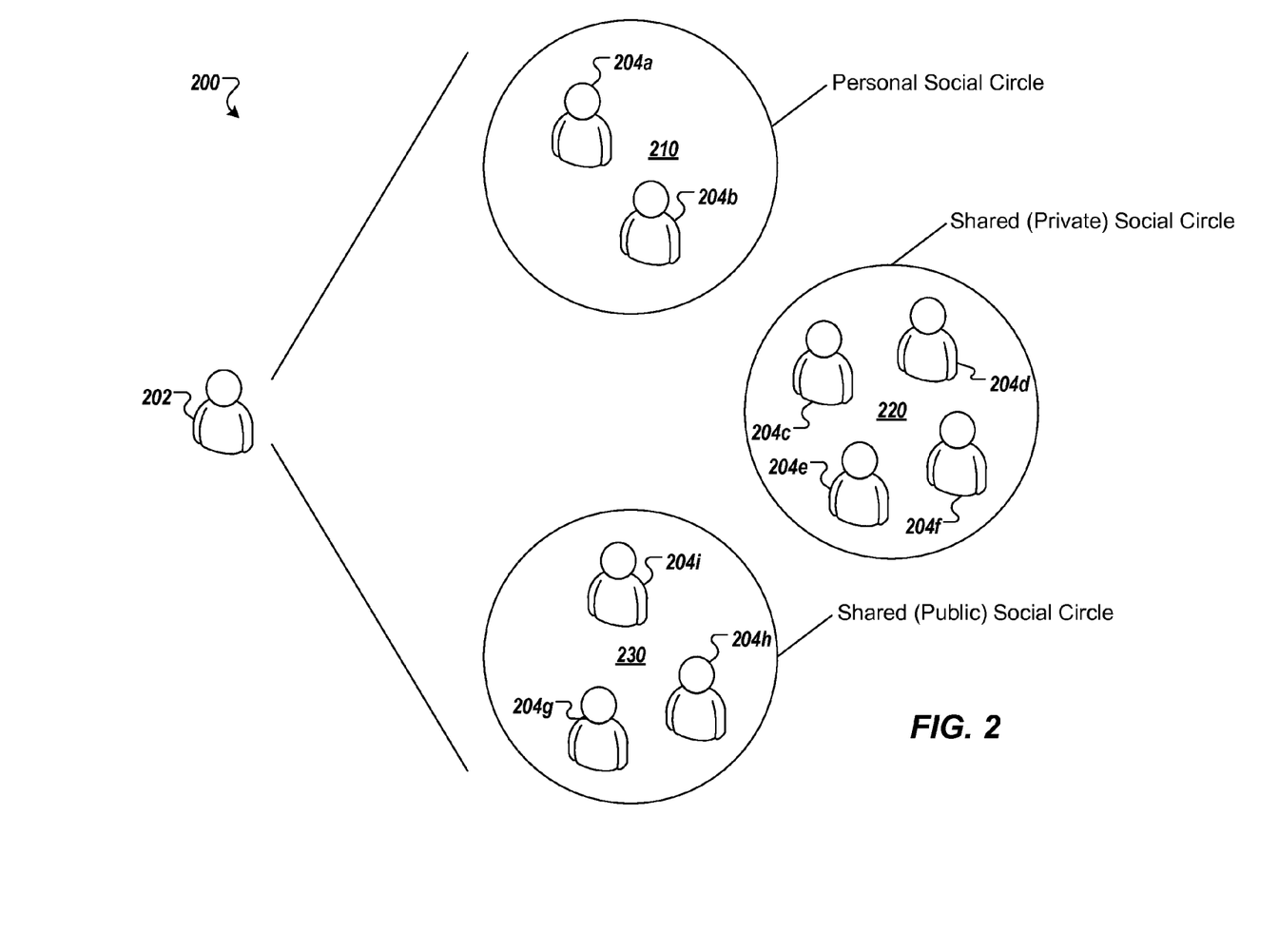
FIG. 2 is a diagram of an example social network including social circles.

FIG. 2 is a diagram of an example social network 200 including social circles. A user 202 is a member of a social network that supports the creation and use of social circles (e.g., the social network provided by the server device 112 of FIG. 1). In the present example, the user 202 has a number of contacts 204a-204i with which the user 202 can have some form of relationship (e.g., friends, coworkers, customers, teammates, clients, relatives, club members, classmates). The user 202 categorizes the contacts 204a-204i by assigning them to one or more social circles, such as a social circle 210, a social circle 220, and a social circle 230. A social circle 240, which has a number of contacts 242a-242c, is provided as a query-based social circle that can be automatically generated without input from the user 202. In some implementations, the social circle 240 can be generated based on information gathered from and has some commonality among the user 202 and the users 242a-242c (e.g., posts, uploaded photos, check-ins, volunteered location information).

The social circle 210 is a personal circle. In some implementations, personal circles are groupings created by and may be known only to the user 202 (e.g., the contacts 204a, 204b may receive no indication that they are in the user's 202 personal social circle 210). In some implementations, personal social circles are groupings created by the user 202 and may be known to the user 202 as well as the contacts (e.g., contacts 204a, 204b) that are members of the social circle (e.g., the contacts 204a, 204b receive an indication that they have been added to the personal social circle 210).

In some implementations, personal circles may be used to organize and categorize the contacts 204a-204i in ways that are relevant to the user 202. In some implementations, the user 202 may use personal social circles to organize contacts in order to discretely target which of his contacts 204a-204i will see certain postings or have access to particular information. For example, the user 202 may be planning a surprise party for a small group of friends. As such, the user can organize contacts into "Surprise Party Attendees" and "Surprise Party Honorees" personal circles. By doing so, the user 202 may better target selected postings to the friends attending and/or helping to plan the surprise party (i.e., Surprise Party Attendees), while targeting selected postings to friends that are to be honored at the surprise party (i.e., Surprise Party Honorees) to maintain the integrity of the surprise.

The social circle 220 is a shared private circle, which may also be referred to simply as a shared circle. In general, shared private circles are social circles that the user 202 creates and invites contacts to voluntarily join. Contacts that accept the invitation become members of the shared private circle. Members of a shared private circle can see information posted to that circle by the user 202 and can post information to be shared with other members of the shared private circle. For example, the user 202 may tend to post a large number of jokes to the social network. However, while some of the contacts 204a-204i may find the jokes to be entertaining, others may find them to be simply annoying. Realizing this, the user 202 may create a "jokes" shared private circle and invite some or all of the contacts 204a-204i to join. With the "jokes" social circle in place, the user 202 may post witticisms to the "jokes" circle, and only those contacts who have accepted the invitation are able to see the comicality of the user 202. Similarly, members of the shared private circle are able to post messages to the circle, and those posts are visible to other members of that circle.

The social circle 230 is a shared public circle. In general, shared public circles are social circles that the user 202 creates, and invites contacts to voluntarily join. Further, the existence of a shared public circle is publicly available such that other users of the social networking service (e.g., not necessarily just the user's 202 contacts 204a-204i) may request to join the public social circle. Members of shared public circles may post information to, and see updates posted by, other members of the same public shared circle. In some implementations, public shares circles may be "fan" or "group" circles (e.g., circles dedicated to a particular place, event, product, movie, celebrity, sports team, company, concept, philosophy, organization, support network). For example, the user 202 may create a shared public circle for his band, and fans of his act may join the circle to discuss upcoming shows, download MP3s of the band's music, or post videos from recent concerts. In another example, the user 202 may create a shared public circle for alumni of his high school graduating class, which his former classmates may find and join in order to stay in touch with one another and post pictures from their school days. Once a shared public circle is created, in some implementations the user 202 can invite people to join the circle. In some implementations, nonmembers of the circle can request membership in the shared public circle, and membership in a shared public circle may be automatic upon request, or may require the user's 202 approval to become members of the shared public circle.

In some implementations, one or more default social circles can be provided or suggested to a user when the user subscribes to a social networking service. For example, "Friends," "Family," and "Coworkers" social circles can automatically be provided in a user's profile upon the user subscribing to the particular social networking service. Other social circles can automatically be provided including, for example, an "Acquaintances" social circle and/or a "Just Following" social circle. In some implementations, the automatically created or suggested social circles can include personal social circles. Although default social circles can be automatically provided, it may be left to the user to actually populate the default social circles with contacts. For example, each of the default social circles may initially be empty of contacts, and the user populates each of the default social circles as discussed in further detail herein.

As discussed herein, digital content can be distributed to contacts within the social networking service including one or more social circles, such that they are exclusively viewable by the indicated contacts and/or contacts within one or more indicated social circles. For example, a user of the social networking service can generate a post, also referred to as an item, and indicate one or more social circles for distribution of the post. In some implementations, an auto-complete component enables the user to type in part of the name of a social circle and/or individual contact to specify which social circles and/or individual contacts require delivery of the post content. During a post write-time, a post data set is transmitted from the user's client computing device (e.g., client device 102 of FIG. 1) to a distribution hub, which can be provided at a server (e.g., server system 112 of FIG. 1). The post data set includes a plurality of data. In some implementations, the post data set includes post content data (e.g., text, uniform resource indicator (URI)), timestamp data (e.g., a timestamp indicating the time that the post was generated), distribution data (e.g., contacts and/or one or more social circles), and identification (ID) data (e.g., an ID assigned to the post data set upon generation of the post).

In some implementations, the distribution data is processed to provide an access control list (ACL) that specifies which contacts within the social networking system are granted access to the post content. In some implementations, social affinity scores can also be processed to provide the ACL. For example, the distribution data can indicate that the post content is to be accessible by and/or distributed to a particular user.

Generally, the distribution hub determines end points the post data set is to be distributed to based on the ACL. More specifically, the set of contacts that may care about the post and/or that are allowed access to the post is determined based on the ACL, and the ID of the post is written to a per user/view index at the distribution hub. When fetching posts to distribute to a user, the user/view index is accessed and the IDs of the various posts that the user is allowed to view are determined. The post data sets are retrieved from a data store (e.g., data store 118 of FIG. 1) and are transmitted to a client device associated with the requesting user. In some implementations, and as discussed in further detail herein, the ACL can be provided based on the overall score, the quality score and/or the social affinity score.

Figure 3:
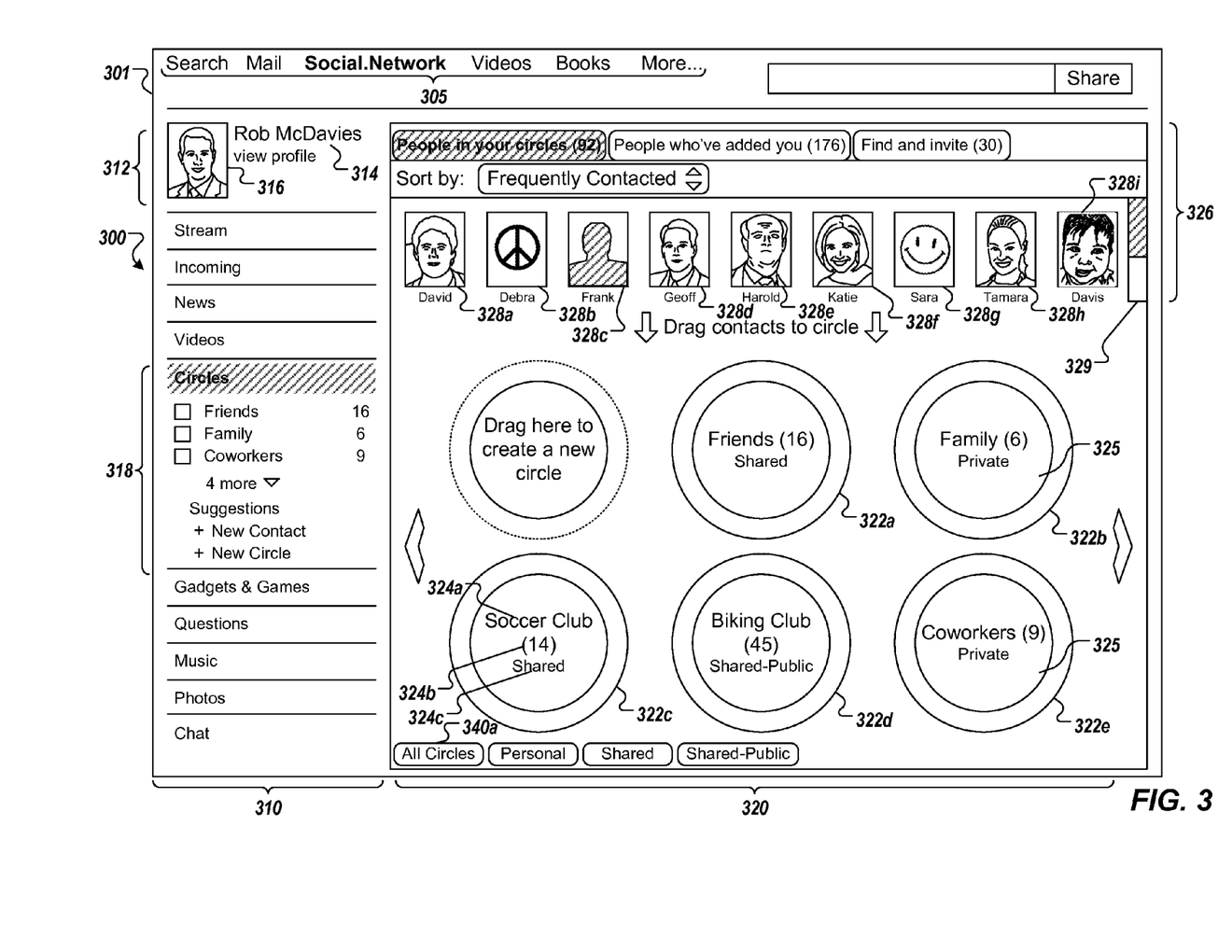
FIG. 3 depicts a screen-shot of example graphical user interface for creating and maintaining social circles.

FIG. 3 depicts a screen-shot 300 of an example graphical user interface for creating and maintaining social circles. In the screen-shot 300, a social graph editor user interface (UI) 301 is shown. In some implementations, the UI 301 can be the interface presented by a purpose made social networking application, while in some implementations the UI 301 can be one or more web pages of a social networking website displayed in a general purpose web browser.

In the example of FIG. 3, the UI 301 includes a number of choices presented in a menu bar 305. In the present example, the "Social Network" choice has been selected by a user. This selection causes a web-based social networking application to be executed and a social network menu 310 to be displayed. The social network menu 310 includes a profile indicator 312 in which information such as a user name 314 and a user image 316 associated with the currently logged in user are displayed.

The social network menu 310 also displays, among other items, a social circles sub-menu 318. The social circles sub-menu 318, when selected (e.g., as represented by the highlighting of the submenu's title), causes a social circle display 320 to be presented. The social circle display 320 includes a number of circles 322a-322e that are visual representations of various social circles that the user has created or has permission to edit. Each of the circles 322a-322e displays information about the social circle it represents. For example, the circle 322c displays a name 324a, a count 324b of the number of contacts associated with the social circle, and an indication 324c of what kind of circle (e.g., personal, private shared, public shared) that the circle 322c is.

The social circle display 320 also includes a contact display 326. The contact display 326 provides a graphical interface for viewing, selecting, and organizing items in the user's contact lists. A collection of contact icons 328a-328i represents the contacts or other entities (e.g., organizations, places, or other items) socially networked with the particular user. In some implementations, the icons can be digital photos of the contacts they represent (e.g., the icons 328a, 328d), arbitrary images (e.g., the icons 328b, 328g), or placeholders (e.g., when the contact has no image associated with their account, such as the icon 328c). In some implementations, the icons can include additional information, such as the names of each contact. A scroll bar 329 is provided for the user to view additional contact icons that may not fit into the initial view.

Figure 4:
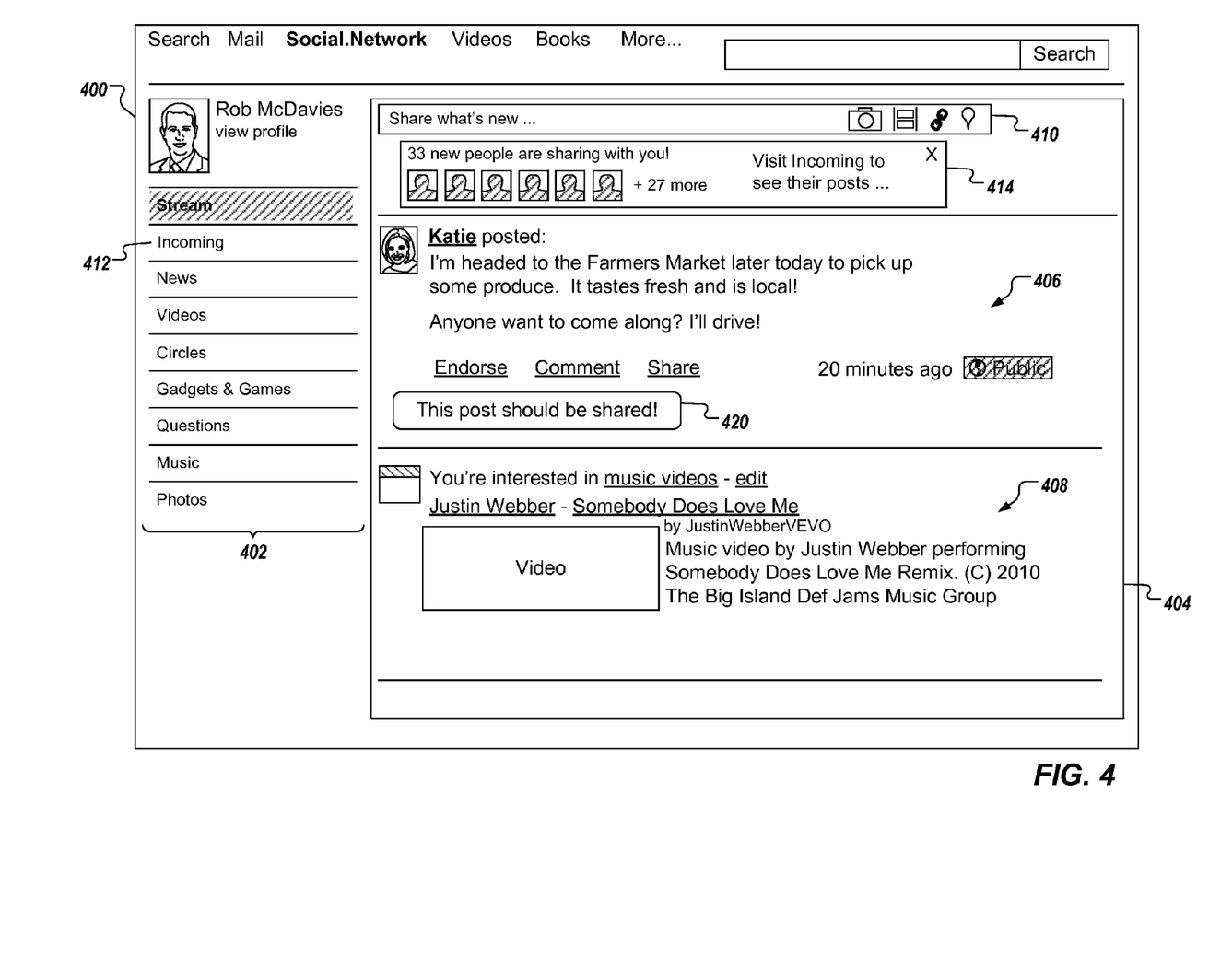
FIG. 4 depicts a screen-shot of an example stream page for a user of a social networking service.

FIG. 4 depicts a screen-shot of an example stream page 400 for a user of a social networking service. For example, the stream page 400 can be provided as a web page within a website of a social networking service, and can display digital content that has been shared with a user associated with the stream page 400. In the illustrated example, the example user includes "Rob McDavies" and the stream page 400 displays items (i.e., digital content) that other users have shared with the user and/or items that the user has shared with other users. The stream page 400 includes a social network menu 402 and an item region 404. Example items 406, 408 that have been distributed to the user are displayed in the item region 404. Generally, the items 406, 408 displayed in the item region 404 include digital content that is distributed to the user from contacts established within the social networking service. A content sharing interface 410 can also be provided in the item region 404. The user can activate (e.g., click on) the content sharing interface 410 to share digital content. Although two items 406, 408 are depicted in FIG. 4, it is appreciated that the stream page 400 can display any number of items to the user.

3. Example User Activity Scoring

As introduced above, implementations of the present disclosure are directed to promoting user interactions in a social networking service. In particular, implementations of the present disclosure are directed to promoting user interactions based on user activity scores. As also introduced above, a user activity score associated with a user can be determined based on one or more signals. Examples signals can include how long the user has been using the social networking service, how recently the user has received a notification from the social networking service, how often the user interacts with the social networking service, how often the user interacts with items distributed by other users of the social networking service, how often the user distributes items using the social networking service, how many contacts the user has within the social networking service, a degree of completion of a profile of the user, a number of contact suggestions that have been accepted by the user, how many features of the social networking service used by the user, and a duration that the user interacts with the social networking service.

In some implementations, each of the signals can be quantified by assigning a value thereto. The values of the signals can be combined to determine the user activity score. In some examples, the values can be summed to provide a total value, the total value being provided as the value of the user activity score. In some examples, a maximum value can be selected from the values, and the value of the user activity score can be set to the maximum value. In some examples, a respective weight can be applied to each value to affect an influence of each value on the user activity score. For example, a first value corresponding to a first signal can be associated with a first weighting factor and a second value corresponding to a second signal can be associated with a second weighting factor. The first weighting factor can be greater than the second weighting factor. The first value can be multiplied by the first weighting factor to provide a first weighted value, and the second value can be multiplied by the second weighting factor to provide a second weighted value. The user activity score can be determined based on the first weighted value and the second weighted value. In this manner, and because the first weighting factor is greater than the second weighting factor, an influence of the first value on the user activity score is boosted. In some examples, the user activity score can be normalized to be within a predefined range (e.g., to range from 0 to 1).

In some implementations, a first signal can be based on how long the user has been using the social networking service. For example, when the user first joins the social networking service (e.g., by establishing a profile within the social networking service), a value of the first signal can be set to a minimum value (e.g., 0). In this manner, the first signal can reflect a brand new user as an infrequent user. The value of the first signal can be incrementally increased based on time after the user first joins the social networking service. In some examples, the value of the first signal can be set to a first intermediate value when a "time since joining" is greater than a first time threshold, but is less than or equal to a second time threshold. For example, if the time since joining is greater than the first time threshold and is less than or equal to the second time threshold, the value of the first signal can be set to a first intermediate value. The first intermediate value can be greater than the minimum value, but less than a maximum value (e.g., 10). In some examples, the value of the first signal can be set to a second intermediate value when the time since joining is greater than the second time threshold, but is less than or equal to a third time threshold. For example, if the time since joining is greater than the second time threshold and is less than or equal to the third time threshold, the value of the first signal can be set to the second intermediate value. The second intermediate value can be greater than the first intermediate value, but less than the maximum value. In some examples, the value of the first signal can be set to the maximum value when the time since joining is greater than the third time threshold.

In some implementations, a second signal can be based on how recently the user has received a notification from the social networking service. In some examples, notifications can be generated in response to the occurrence of an event that can directly or indirectly affect the user. In one example, an event can include another user adding the user as a contact within the social networking, and a notification is provided to the user informing the user of the occurrence of the event. In one example, an event can include another user interacting with an item (e.g., commenting on, endorsing, sharing) that the user had interacted with (e.g., commenting on, endorsing, sharing), and a notification is provided to the user informing the user of the occurrence of the event. Other example events can include digital content being shared with the user, and a contact of the user becoming more active within the social networking service (e.g., moving from an infrequent user to a prolific user).

In some implementations, the most recent notification that was provided to the user can be identified (e.g., based on respective timestamps associated with the notifications). A difference between the timestamp of the most recent notification can be compared to a current time. In some examples, the current time can include a time at which a value of the second signal is being determined. The value of the second signal can be determined based on the difference and one or more thresholds. For example, if the difference is less than a first threshold difference, the value of the second signal can be set to a maximum value (e.g., 1). As another example, if the difference is greater than or equal to the first threshold difference and is less than a second threshold difference, the value of the second signal can be set to a first intermediate value. The first intermediate value can be less than the maximum value and greater than a minimum value (e.g., 0). As another example, if the difference is greater than or equal to the second threshold difference and is less than a third threshold difference, the value of the second signal can be set to a second intermediate value. The second intermediate value can be less than the first intermediate value and greater than the minimum value. If the difference is greater than or equal to the third threshold difference, the value of the second signal can be set to the minimum value.

In some implementations, a third signal can be based on how often the user interacts with the social networking service. In some examples, the third signal can be based on the last time that the user logged into the social networking service. A difference between the timestamp of the last log in event can be compared to a current time. In some examples, the current time can include a time at which a value of the third signal is being determined. The value of the third signal can be determined based on the difference and one or more thresholds. For example, if the difference is less than a first threshold difference, the value of the third signal can be set to a maximum value (e.g., 1). As another example, if the difference is greater than or equal to the first threshold difference and is less than a second threshold difference, the value of the third signal can be set to a first intermediate value. The first intermediate value can be less than the maximum value and greater than a minimum value (e.g., 0). As another example, if the difference is greater than or equal to the second threshold difference and is less than a third threshold difference, the value of the third signal can be set to a second intermediate value. The second intermediate value can be less than the first intermediate value and greater than the minimum value. If the difference is greater than or equal to the third threshold difference, the value of the third signal can be set to the minimum value. It is appreciated that respective values of the first, second and third threshold differences discussed with respect to the third signal can be the same as or can be different from respective values of the first, second and third threshold differences discussed with respect to the second signal.

In some examples, the third signal can be based on an average use frequency. In some examples, the average use frequency can be determined as the average number of times that the user logs into the social networking service per day. The value of the third signal can be determined based on the average use frequency and one or more thresholds. For example, if the average use frequency is less than a first threshold frequency, the value of the third signal can be set to a minimum value (e.g., 0). As another example, if the average use frequency is greater than or equal to the first threshold frequency and is less than a second threshold frequency, the value of the third signal can be set to a first intermediate value. The first intermediate value can be greater than the minimum value and less than a maximum value (e.g., 1). As another example, if the average use frequency is greater than or equal to the second threshold frequency and is less than a third threshold frequency, the value of the third signal can be set to a second intermediate value. The second intermediate value can be greater than the first intermediate value and less than the maximum value. If the average use frequency is greater than or equal to the third threshold frequency, the value of the third signal can be set to the maximum value.

In some implementations, a fourth signal can be based on how often the user interacts with items distributed by other users of the social networking service. In some examples, the fourth signal can be based on a number of interactions that the user has generated. In some examples, interactions can include comments on items, shares of items, and/or endorsements of items. The value of the fourth signal can be determined based on the number of interactions and one or more thresholds. For example, if the number of interactions is less than a first threshold number, the value of the fourth signal can be set to a minimum value (e.g., 0). As another example, if the number of interactions is greater than or equal to the first threshold number and is less than a second threshold number, the value of the fourth signal can be set to a first intermediate value. The first intermediate value can be greater than the minimum value and less than a maximum value (e.g., 1). As another example, if the number of interactions is greater than or equal to the second threshold number and is less than a third threshold number, the value of the fourth signal can be set to a second intermediate value. The second intermediate value can be greater than the first intermediate value and less than the maximum value. If the number of interactions is greater than or equal to the third threshold number, the value of the fourth signal can be set to the maximum value.

In some examples, the fourth signal can be based on an average interaction frequency. In some examples, the average interaction frequency can be determined as the average number of interactions (e.g., comments on items, shares of items, endorsements of items) that the user generates within the social networking service per day. The value of the fourth signal can be determined based on the average interaction frequency and one or more thresholds. For example, if the average interaction frequency is less than a first threshold frequency, the value of the fourth signal can be set to a minimum value (e.g., 0). As another example, if the average interaction frequency is greater than or equal to the first threshold frequency and is less than a second threshold frequency, the value of the fourth signal can be set to a first intermediate value. The first intermediate value can be greater than the minimum value and less than a maximum value (e.g., 1). As another example, if the average interaction frequency is greater than or equal to the second threshold frequency and is less than a third threshold frequency, the value of the fourth signal can be set to a second intermediate value. The second intermediate value can be greater than the first intermediate value and less than the maximum value. If the average interaction frequency is greater than or equal to the third threshold frequency, the value of the fourth signal can be set to the maximum value.

In some implementations, a fifth signal can be based on how often the user distributes items using the social networking service. In some examples, the fifth signal can be based on a number of items that the user has generated and distributed. The value of the fifth signal can be determined based on the number of items and one or more thresholds. For example, if the number of items is less than a first threshold number, the value of the fifth signal can be set to a minimum value (e.g., 0). As another example, if the number of items is greater than or equal to the first threshold number and is less than a second threshold number, the value of the fifth signal can be set to a first intermediate value. The first intermediate value can be greater than the minimum value and less than a maximum value (e.g., 1). As another example, if the number of items is greater than or equal to the second threshold number and is less than a third threshold number, the value of the fifth signal can be set to a second intermediate value. The second intermediate value can be greater than the first intermediate value and less than the maximum value. If the number of items is greater than or equal to the third threshold number, the value of the fifth signal can be set to the maximum value.

In some examples, the fifth signal can be based on an average item frequency. In some examples, the average item frequency can be determined as the average number of items that the user generates and distributes within the social networking service per day. The value of the fifth signal can be determined based on the average item frequency and one or more thresholds. For example, if the average item frequency is less than a first threshold frequency, the value of the fifth signal can be set to a minimum value (e.g., 0). As another example, if the average item frequency is greater than or equal to the first threshold frequency and is less than a second threshold frequency, the value of the fifth signal can be set to a first intermediate value. The first intermediate value can be greater than the minimum value and less than a maximum value (e.g., 1). As another example, if the average item frequency is greater than or equal to the second threshold frequency and is less than a third threshold frequency, the value of the fifth signal can be set to a second intermediate value. The second intermediate value can be greater than the first intermediate value and less than the maximum value. If the average item frequency is greater than or equal to the third threshold frequency, the value of the fifth signal can be set to the maximum value.

In some implementations, a sixth signal can be based on how many contacts the user has within the social networking service. In some examples, a number of contacts can account for contacts that the user has established a symmetrical relationship with in the social networking service. In some examples, a symmetrical relationship is provided when the user adds another user as a contact in the social networking service, and the other user reciprocates by adding the user as a contact in the social networking service. The value of the sixth signal can be determined based on the number of contacts and one or more thresholds. For example, if the number of contacts is less than a first threshold number, the value of the sixth signal can be set to a minimum value (e.g., 0). As another example, if the number of contacts is greater than or equal to the first threshold number and is less than a second threshold number, the value of the sixth signal can be set to a first intermediate value. The first intermediate value can be greater than the minimum value and less than a maximum value (e.g., 1). As another example, if the number of contacts is greater than or equal to the second threshold number and is less than a third threshold number, the value of the sixth signal can be set to a second intermediate value. The second intermediate value can be greater than the first intermediate value and less than the maximum value. If the number of contacts is greater than or equal to the third threshold number, the value of the sixth signal can be set to the maximum value.

In some implementations, a seventh signal can be based on a degree of completion of a profile of the user. As introduced above, a profile can be associated with the user within the social networking service. The profile can include information regarding the user. Example information can include occupation, employment, education, gender, birthday, marital status, places lived, places visited, hobbies, and/or any other information the user may wish to share. A degree of profile completion can be determined based on the amount of information provided in the user's profile. The value of the seventh signal can be determined based on the number of contacts and one or more thresholds. For example, if the degree of profile completion is less than a first threshold degree, the value of the seventh signal can be set to a minimum value (e.g., 0). As another example, if the degree of profile completion is greater than or equal to the first threshold degree and is less than a second threshold degree, the value of the seventh signal can be set to a first intermediate value. The first intermediate value can be greater than the minimum value and less than a maximum value (e.g., 1). As another example, if the degree of profile completion is greater than or equal to the second threshold degree and is less than a third threshold degree, the value of the seventh signal can be set to a second intermediate value. The second intermediate value can be greater than the first intermediate value and less than the maximum value. If the degree of profile completion is greater than or equal to the third threshold degree, the value of the seventh signal can be set to the maximum value.

In some implementations, an eighth signal can be based on a number of contact suggestions that have been accepted by the user. In some examples, other users of the social networking service can be suggested to the user as potential contacts within the social networking services. A number of accepted contact suggestions can be determined for the user. The value of the eighth signal can be determined based on the number of accepted contact suggestions and one or more thresholds. For example, if the number of accepted contact suggestions is less than a first threshold number, the value of the eighth signal can be set to a minimum value (e.g., 0). As another example, if the number of accepted contact suggestions is greater than or equal to the first threshold number and is less than a second threshold number, the value of the eighth signal can be set to a first intermediate value. The first intermediate value can be greater than the minimum value and less than a maximum value (e.g., 1). As another example, if the number of accepted contact suggestions is greater than or equal to the second threshold number and is less than a third threshold number, the value of the eighth signal can be set to a second intermediate value. The second intermediate value can be greater than the first intermediate value and less than the maximum value. If the number of accepted contact suggestions is greater than or equal to the third threshold number, the value of the eighth signal can be set to the maximum value.

In some implementations, a ninth signal can be based on how many features of the social networking service are used by the user. Example features can include an instant messaging (chat) feature, a multi-way video chat feature, a completed profiles feature, a photo sharing feature, a website endorsement feature, an item endorsement feature, a re-sharing items feature, a location check-in feature and a mobile messaging feature. A number of used features can be determined for the user. The value of the ninth signal can be determined based on the number of used features and one or more thresholds. For example, if the number of used features is less than a first threshold number, the value of the ninth signal can be set to a minimum value (e.g., 0). As another example, if the number of used features is greater than or equal to the first threshold number and is less than a second threshold number, the value of the ninth signal can be set to a first intermediate value. The first intermediate value can be greater than the minimum value and less than a maximum value (e.g., 1). As another example, if the number of used features is greater than or equal to the second threshold number and is less than a third threshold number, the value of the ninth signal can be set to a second intermediate value. The second intermediate value can be greater than the first intermediate value and less than the maximum value. If the number of used features is greater than or equal to the third threshold number, the value of the ninth signal can be set to the maximum value.

In some implementations, a tenth signal can be based on an average duration that the user interacts with the social networking service. In some examples, a session can be defined between a user logging into the social networking service and the user leaving the social networking service. In some examples, the user leaving the social networking service can occur when the user logs out of the social networking service. In some examples, the user leaving the social networking service can occur when the user navigates away from a web page of the social networking service and to a web page of a different domain. Each session can include a first timestamp associated with the user logging into the social networking service and a second timestamp associated with the user leaving the social networking service. For each session, a duration can be determined based on a difference between the first timestamp and the second timestamp. An average duration can be determined across all sessions for the user, or across a defined subset of sessions.

The value of the tenth signal can be determined based on the average duration and one or more thresholds. For example, if the average duration is less than a first threshold duration, the value of the tenth signal can be set to a minimum value (e.g., 0). As another example, if the average duration is greater than or equal to the first threshold duration and is less than a second threshold duration, the value of the tenth signal can be set to a first intermediate value. The first intermediate value can be greater than the minimum value and less than a maximum value (e.g., 1). As another example, if the average duration is greater than or equal to the second threshold duration and is less than a third threshold duration, the value of the tenth signal can be set to a second intermediate value. The second intermediate value can be greater than the first intermediate value and less than the maximum value. If the average duration is greater than or equal to the third threshold duration, the value of the tenth signal can be set to the maximum value.

As discussed above, the user activity score for a particular user can be determined based on one or more of the first through tenth signals discussed in detail herein. It is appreciated, however, that implementations of the present disclosure are not limited to the example signals discussed herein.

4. Example Use Cases

Referring again to FIG. 3, one or more users of the social networking service can be suggested as contacts to one or more other users based on respective user activity scores. In the example of FIG. 3, the user "Rob McDavies" can be categorized as a prolific user based on an associated user activity score. The users represented by the contact icons 328a, 328b (i.e., David and Debra, respectively) can each be categorized as infrequent users based on respective user activity scores. The users represented by the contact icons 328c-328i can each be categorized as one of frequent users and prolific users based on respective user activity scores. In some examples, because the users represented by the contact icons 328a, 328b are categorized as infrequent users, they are displayed first within the contact display 326 in an effort to promote these users to the user "Rob McDavies." In this manner, infrequent users of the social networking service are promoted within the social networking service. In some examples, because the user "Rob McDavies" is categorized as a prolific user and the users represented by the contact icons 328a, 328b are categorized as infrequent users, they are displayed first within the contact display 326 in an effort to promote these users to the user "Rob McDavies." In this manner, infrequent users of the social networking service can be paired with a prolific user to promote interaction with the infrequent users within the social networking service.

In some implementations, the contact icons displayed within the contact display 326 can be based on a quota. For example, a quota can include an W/Z split indicating that W % of the contact icons to be displayed are associated with frequent users and/or prolific users and Z % of the contact icons to be displayed are associated with infrequent users. In some examples, where the contact icons are displayed relative to one another (e.g., an order in which the contact icons are displayed) can be determined independently of the respective user categories. In some examples, where the contact icons are displayed relative to one another (e.g., an order in which the contact icons are displayed) can be determined based on the respective user categories.

Figure 5:
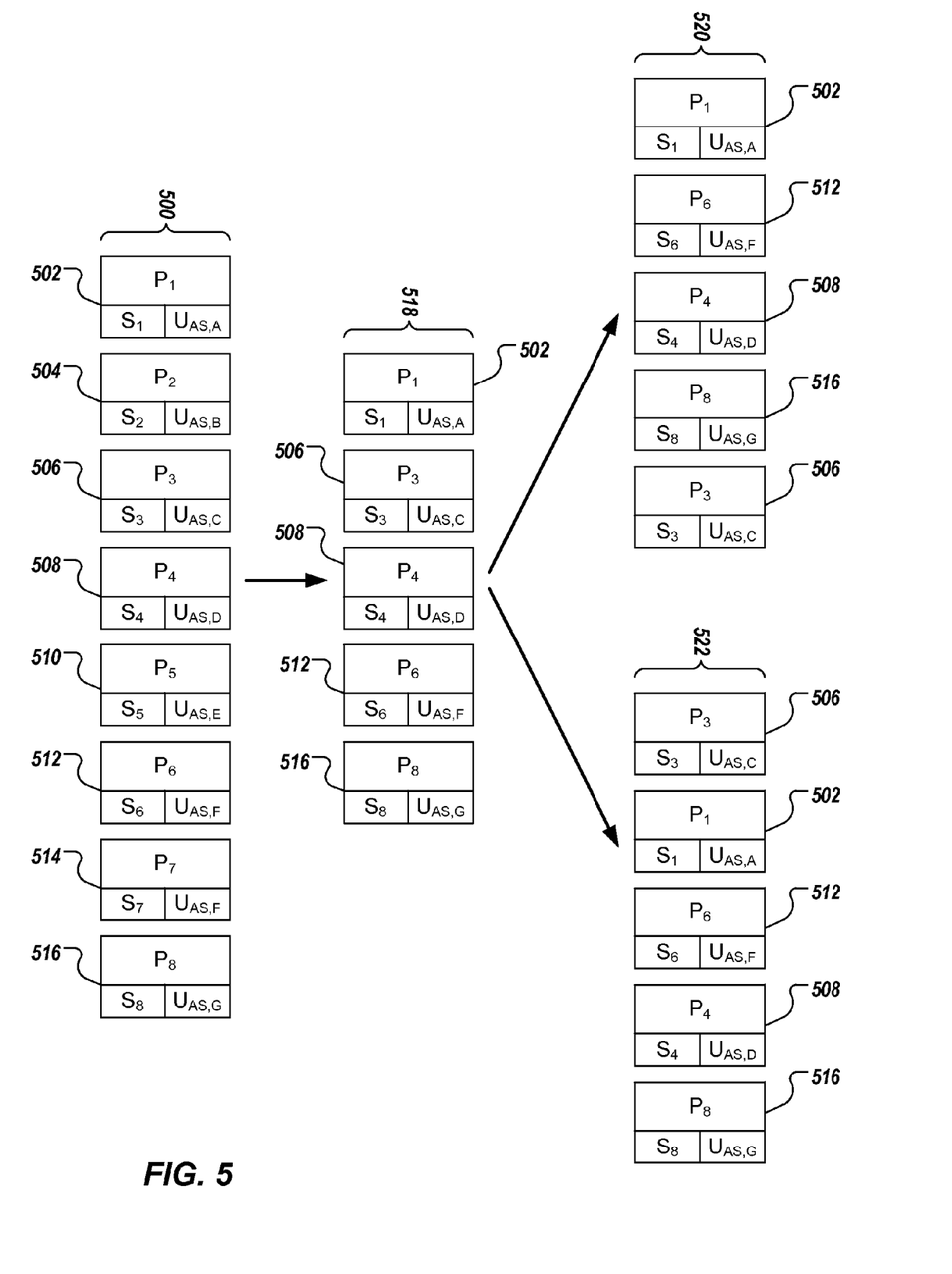
FIG. 5 depicts example ranking and ordering of items in a stream page for a user.

FIG. 5 depicts example ranking and ordering of items in a stream page for a user. In some implementations, ranking and ordering of items displayed to a user within a stream page of the user can be influenced based on user activity scores. FIG. 5 includes a set of potential items 500 that have been distributed to the user and that could be displayed within the stream page of the user. The set of potential items 500 includes items 502, 504, 506, 508, 510, 512, 514, 516. Each item 502, 504, 506, 508, 510, 512, 514, 516 includes digital content data ($P_1$, $P_2$, $P_3$, $P_4$, $P_5$, $P_6$, $P_7$, $P_8$, respectively), item score ($S_1$, $S_2$, $S_3$, $S_4$, $S_5$, $S_6$, $S_7$, $S_8$, respectively) and associated user activity scores ($U_{AS,A}$, $U_{AS,B}$, $U_{AS,C}$, $U_{AS,D}$, $U_{AS,E}$, $U_{AS,F}$, $U_{AS,F}$, $U_{AS,G}$, respectively). In the depicted example, each user activity score is associated the user (of users A-G) that authored the respective item (e.g., the user F authored both of the items 512, 514).

In some implementations, a set of to be displayed items 518 can be defined based on the item scores and user activity scores associated with the items of the set of potential items 500. In the depicted example, the set of to be displayed items 518 includes item 502, item 506, item 508, item 512 and item 516. In some examples, the items that are to be included in the set of to be displayed items 518 can be selected based on a quota. For example, a quota can include an X/Y split indicating that X % of the items to be displayed are selected based on item score and Y % of the items to be displayed are selected based on user activity score.

In the depicted example, the number of items that are to be displayed in the stream page is equal to five items, and the quota is provided as an 80/20 split. Consequently, four items are selected from the set of potential items 500 based on respective item scores, and one item is selected from the set of potential items 500 based on respective user activity scores. The item scores of the items 502, 506, 508, 512 are each greater than the item scores of the items 504, 510, 514, 516. Consequently, the items 502, 506, 508, 512 are included in the set of to be displayed items. The user activity score of the item 516 indicates that the user that authored the item 516 is an infrequent user. Consequently, the item 516 is also included in the set of to be displayed items regardless of item score.

In some examples, items within the set of to be displayed items 518 can be ordered based on item score to provide a set of items 520. The items 502, 506, 508, 512, 516 are displayed in the stream page of the user in the order provided in the set of items 520. In the depicted example, $S_1 > S_6 > S_4 > S_8 > S_3$. In some examples, items within the set of to be displayed items 518 can be ordered based on item score and user activity score to provide a set of items 522. The items 502, 506, 508, 512, 516 are displayed in the stream page of the user in the order provided in the set of items 522. In the depicted example, the item 516 is displayed first in an effort to promote interaction with digital content provided by an infrequent user.

In some implementations, users can be prompted to assist one or more other users in interacting with the social networking service based on user activity scores. In some examples, a prolific user can be a contact of an infrequent user within the social networking service. The prolific user can receive a notification from the social networking service prompting the prolific user to assist the infrequent user with one or more tasks. For example, the infrequent user can have a partially completed profile. Consequently, the prolific user can receive a notification prompting the prolific user to assist the infrequent user in completing the profile. Example notifications can include prompts for the prolific user to suggest a profile photo, contacts, and/or image tags to the infrequent user.

In some implementations, an infrequent user and/or digital content distributed by an infrequent user can be identified to a prolific user in an effort to induce the prolific user to interact with the infrequent user. Referring again to FIG. 4, the user "Rob McDavies" can be a prolific user and the user "Katie" can be an infrequent user. In some examples, notifications can be associated with items distributed by infrequent users. In the depicted example, the item 406 includes a notification 420 prompting the user "Rob McDavies" to share the item 406 with other users of the social networking service.

In some implementations, high quality items distributed by prolific users can be highlighted or otherwise be prominently displayed within stream pages of infrequent users. In this manner, infrequent users can learn about features available in the social networking service, which the infrequent users have not yet used. In some examples, the quality of the item can be reflected by the item score associated therewith.

5. Example Flowchart(s)

Figure 6:
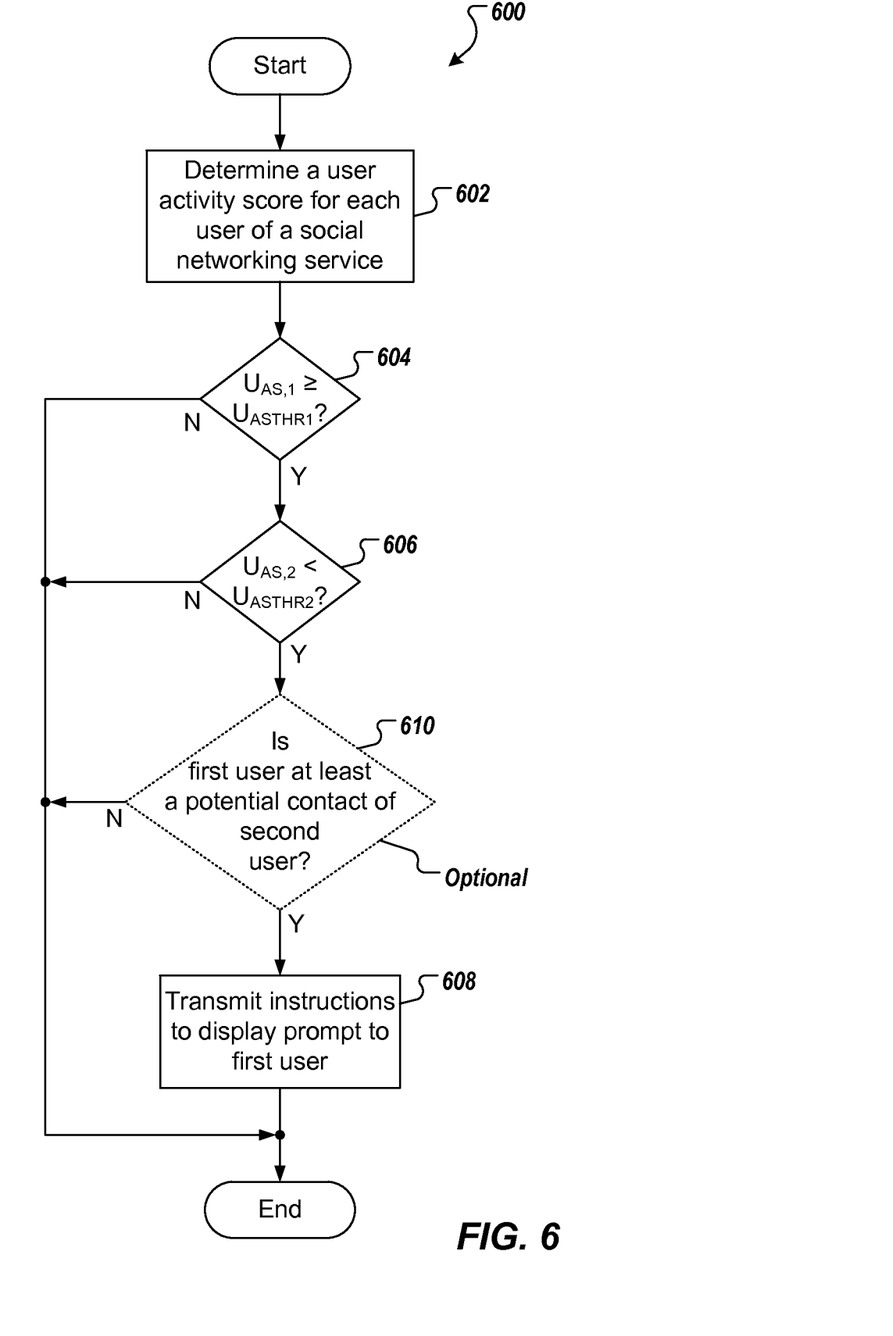
FIG. 6 is a flowchart of an example process that can be executed in implementations of the present disclosure.

FIG. 6 is a flowchart of an example process 600 that can be executed in implementations of the present disclosure. In some implementations, the example process 600 can include operations that are performed using one or more computer programs executed using one or more data processing apparatus (e.g., one or more client-side computing devices and/or one or more server-side computing devices).

A user activity score ($U_{AS}$) is determined for each user of a social networking service (602). It is determined whether a first user activity score ($U_{AS,1}$) associated with a first user is greater than or equal to a first threshold user activity score ($U_{ASTHR1}$) (604). If the first user activity score ($U_{AS,1}$) is not greater than or equal to the first threshold user activity score ($U_{ASTHR1}$), the example process 600 ends. If the first user activity score ($U_{AS,1}$) is greater than or equal to the first threshold user activity score ($U_{ASTHR1}$), it is determined whether a second user activity score ($U_{AS,2}$) associated with a second user is less than a second threshold user activity score ($U_{ASTHR2}$) (606). If the second user activity score ($U_{AS,2}$) is not less than the second threshold user activity score ($U_{ASTHR2}$), the example process 600 ends.

In some examples, if the second user activity score ($U_{AS,2}$) is less than the second threshold user activity score ($U_{ASTHR2}$), instructions are transmitted to display a prompt to the first user (608), the prompt encouraging the first user to interact with the second user within the social networking service.

In some examples, if the second user activity score ($U_{AS,2}$) is less than the second threshold user activity score ($U_{ASTHR2}$), it can be determined whether the first user is at least a potential contact of the second user within the social networking service (610). For example, if the first user is neither a potential contact nor a contact of the second user within the social networking service, the example process 600 ends. If the first user is at least a potential contact of the second user within the social networking service, instructions are transmitted to display a prompt to the first user (608), the prompt encouraging the first user to interact with the second user within the social networking service.

By determining whether the first user is at least a potential contact of the second user within the social networking service, promotion of user interaction between users that might not have any connection to one another can be avoided. For example, if the first user and the second user have not been established as contacts of one another within the social networking service, and have otherwise not directly or indirectly interacted with one another (e.g., within the social networking service and/or outside of the social networking service), the first user will not be prompted to interact with the second user within the social networking service. As another example, if the first user and the second user have not been established as contacts of one another within the social networking service, but have directly or indirectly interacted with one another (e.g., within the social networking service and/or outside of the social networking service), the first user and the second user can be deemed to be potential contacts of one another within the social networking service. For example, both the first user and the second user interact with a third user (e.g., both the first user and the second user have commented on, endorsed, or shared an item distributed by the third user). Consequently, it can be determined that the first user and the second user have indirectly interacted, and are deemed to be potential contacts within the social networking service. As another example, the first user can email or instant message the second user using an email service or an instant messaging service, respectively. Because the first user and the second user have communicated (i.e., via email or instant message), the first user and the second user are deemed to be potential contacts within the social networking service.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the invention can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the invention can be realized in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementation s are within the scope of the following claims. For example, the actions recited in the claims can be performed in a different order and still achieve desirable results.

What is claimed is:

1. A system comprising:
    a computing device; and
    a computer-readable storage device coupled to the computing device and having instructions stored thereon which, when executed by the computing device, cause the computing device to perform operations comprising:
        for users of a computer-implemented social networking service, determining a user activity score, wherein the user activity score for each user is determined based on the activity of each user within the computer-implemented social networking service;
        determining that a first user in the plurality of users is a frequent user based on comparing a first user activity score associated with the first user to a first threshold user activity score;
        determining that a second user in the plurality of users is an infrequent user based on comparing a second user activity score associated with the second user to a second threshold user activity score;
        determining that the first user and the second user are potential contacts of one another within the social networking service;
        identifying an item distributed by the second user using the social networking service, the item associated with an item score, the item score representing a quality of the item; and
        in response to determining that the first user and the second user are potential contacts of one another within the social networking service, that the first user is a frequent user, and that the second user is an infrequent user, determining to display the item in the stream page of the first user to encourage the first user to interact with the second user within the social networking service, although a comparison of the item score of the item to a threshold item score indicates to exclude the item from display in the stream page of the first user,
        wherein the threshold item score defines a value which an item score exceeds for an item associated with the items score to be displayed in a stream page.

2. The system of claim 1, wherein determining the user activity score comprises:
    receiving a plurality of values, each value being associated with a signal that reflects user interaction with the social networking service; and
    determining the user activity score based on one or more values of the plurality of values.

3. The system of claim 2, wherein each value is based on one of: a length of time that a respective user has been a member of the social networking service, a time since a respective user has received a notification from the social networking service, a frequency at which a respective user interacts with the social networking service, a frequency at which a respective user interacts with items distributed by other users of the social networking service, a frequency at which a respective user distributes items using the social networking service, a number of contacts of a respective user within the social networking service, a degree of completion of a profile of a respective user, a number of contact suggestions that have been accepted by a respective user, a number of features of the social networking service that have been used by a respective user, and an average duration that a respective user interacts with the social networking service.

4. The system of claim 2, wherein determining the user activity score comprises summing the values.

5. The system of claim 2, wherein determining the user activity score comprises applying a respective weight to each value of the plurality of values.

6. The system of claim 2, wherein the user activity score ranges between a minimum value and a maximum value.

7. The system of claim 1, wherein the operations further comprise transmitting instructions to display a graphical representation of a profile of the second user within a contact display of the first user.

8. The system of claim 7, wherein the graphical representation comprises a contact icon.

9. The system of claim 1, wherein the operations further comprise transmitting instructions to display a notification requesting the first user to assist the second user with a task within the social networking service.

10. The system of claim 9, wherein the task comprises completing a profile associated with the second user.

11. The system of claim 9, wherein the task comprises using a feature of the social networking service.

12. The system of claim 1, comprising:
    determining a set of items to be displayed in the first user's stream page the set of items including a first subset of items and a second subset of items, each item in the first subset of items are determined to be displayed in the first user's stream page based on a comparison of respective item scores for each of the items in the first subset of items to the threshold item score, and each item in the second subset of items having been distributed by respective social network users which are determined to be infrequent users; and
    displaying the items in the set of items in the first user's stream page,
    wherein the item distributed by the second user is included in the second subset of items, and
    wherein each item in the second subset of items are included in the set of items regardless of respective items scores associated with each of the items in the second subset of items.

13. The system of claim 12, wherein a first number of items included in the first subset of items and a second number of items included in the second subset of items are determined based on a quota.

14. The method of claim 1, wherein the first user is not a contact of the second user within the social networking service.

15. Non-transitory computer storage device encoded with one or more computer programs, the one or more computer programs comprising instructions that when executed by data processing apparatus cause the data processing apparatus to perform operations comprising:

for users of a computer-implemented social networking service, determining a user activity score, wherein the user activity score for each user is determined based on the activity of each user within the computer-implemented social networking service;

determining that a first user in the plurality of users is a frequent user based on comparing a first user activity score associated with the first user to a first threshold user activity score;

determining that a second user in the plurality of users is an infrequent user based on comparing a second user activity score associated with the second user to a second threshold user activity score;

determining that the first user and the second user are potential contacts of one another within the social networking service;

identifying an item distributed by the second user using the social networking service, the item associated with an item score, the item score representing a quality of the item; and     in response to determining that the first user and the second user are potential contacts of one another within the social networking service, that the first user is a frequent user, and that the second user is an infrequent user, determining to display the item in the stream page of the first user to encourage the first user to interact with the second user within the social networking service, although a comparison of the item score of the item to a threshold item score indicates to exclude the item from display in the stream page of the first user,     wherein the threshold item score defines a value which an item score exceeds for an item associated with the items score to be displayed in a stream page.

16. The media of claim 15, wherein the operations comprise:

determining a set of items to be displayed in the first user's stream page the set of items including a first subset of items and a second subset of items, each item in the first subset of items are determined to be displayed in the first user's stream page based on a comparison of respective item scores for each of the items in the first subset of items to the threshold item score, and each item in the second subset of items having been distributed by respective social network users which are determined to be infrequent users; and     displaying the items in the set of items in the first user's stream page,     wherein the item distributed by the second user is included in the second subset of items, and     wherein each item in the second subset of items are included in the set of items regardless of respective items scores associated with each of the items in the second subset of items.

17. The media of claim 16, wherein a first number of items included in the first subset of items and a second number of items included in the second subset of items are determined based on a quota.

18. A computer-implemented method executing using one or more processing devices, the method comprising:

for users of a computer-implemented social networking service, determining, by the one or more processing devices, a user activity score, wherein the user activity score for each user is determined based on the activity of each user within the computer-implemented social networking service;

determining, by the one or more processing devices, that a first user in the plurality of users is a frequent user based on comparing a first user activity score associated with the first user to a first threshold user activity score;

determining, by the one or more processing devices, that a second user in the plurality of users is an infrequent user based on comparing a second user activity score associated with the second user to a second threshold user activity score;

determining, by the one or more processing devices, that the first user and the second user are potential contacts of one another within the social networking service;

identifying, by the one or more processing devices, an item distributed by the second user using the social networking service, the item associated with an item score, the item score representing a quality of the item; and     in response to determining that the first user and the second user are potential contacts of one another within the social networking service, that the first user is a frequent user, and that the second user is an infrequent user, determining, by the one or more processing devices, to display the item in the stream page of the first user to encourage the first user to interact with the second user within the social networking service, although a comparison of the item score of the item to a threshold item score indicates to exclude the item from display in the stream page of the first user,     wherein the threshold item score defines a value which an item score exceeds for an item associated with the items score to be displayed in a stream page.

19. The method of claim 18, comprising:

determining a set of items to be displayed in the first user's stream page the set of items including a first subset of items and a second subset of items, each item in the first subset of items are determined to be displayed in the first user's stream page based on a comparison of respective item scores for each of the items in the first subset of items to the threshold item score, and each item in the second subset of items having been distributed by respective social network users which are determined to be infrequent users; and     displaying the items in the set of items in the first user's stream page,     wherein the item distributed by the second user is included in the second subset of items, and     wherein each item in the second subset of items are included in the set of items regardless of respective items scores associated with each of the items in the second subset of items.

20. The method of claim 19, wherein a first number of items included in the first subset of items and a second number of items included in the second subset of items are determined based on a quota.

\* \* \* \* \*